US008706567B2

(12) United States Patent
Nash

(10) Patent No.: US 8,706,567 B2
(45) Date of Patent: *Apr. 22, 2014

(54) SYSTEM TO GENERATE AN AGGREGATE INTEREST INDICATION WITH RESPECT TO AN INFORMATION ITEM

(75) Inventor: Adam Nash, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 853 days.

This patent is subject to a terminal disclaimer.

(21) Appl. No.: 12/433,602

(22) Filed: Apr. 30, 2009

(65) Prior Publication Data

US 2009/0282026 A1    Nov. 12, 2009

Related U.S. Application Data

(63) Continuation of application No. 12/366,459, filed on Feb. 5, 2009, now Pat. No. 8,249,949, and a continuation of application No. 11/026,942, filed on Dec. 30, 2004, now Pat. No. 7,490,056.

(60) Provisional application No. 60/625,435, filed on Nov. 4, 2004.

(51) Int. Cl.
*G06Q 30/00* (2012.01)
*G06Q 30/06* (2012.01)
*G06Q 99/00* (2006.01)

(52) U.S. Cl.
CPC ........ *G06Q 30/0633* (2013.01); *G06Q 30/0625* (2013.01); *G06Q 99/00* (2013.01)
USPC .............. 705/26.8; 705/26.62; 705/500

(58) Field of Classification Search
CPC  G06Q 30/0633; G06Q 30/0625; G06Q 99/00
USPC ..................... 705/26.8, 500, 26.62
See application file for complete search history.

(56) References Cited

U.S. PATENT DOCUMENTS 5,006,978 A * 4/1991 Neches .......................... 718/102
6,401,118 B1    6/2002 Thomas
6,480,837 B1   11/2002 Dutta
(Continued)

FOREIGN PATENT DOCUMENTS

EP        1085445 A1    3/2001
JP      2003-337897    11/2003

OTHER PUBLICATIONS

Microsoft Press Computer Dictionary, third edition, Microsoft Press, Redmond, 1997, pp. 228, 403, and 404.*

(Continued)

*Primary Examiner* — Nicholas D Rosen
(74) *Attorney, Agent, or Firm* — Schwegman, Lundberg & Woessner, P.A.

(57) ABSTRACT

A method is provided to publish a list of top ranked listings. The method may include configuring a database to store a plurality of listings published over a network. An interest indication may be received from a user for a listing in the plurality of listings. An interest indication data structure may be created and stored that associates the user with the listing. Also, the top ranked listings may be identified from the plurality of listings based on the number of stored interest indication data structures for each listing. Further, the list of the top ranked listings may be published.

20 Claims, 8 Drawing Sheets

(56) References Cited

U.S. PATENT DOCUMENTS

| | | | |
|---|---|---|---|
| 6,489,968 | B1 | 12/2002 | Ortega et al. |
| 6,606,657 | B1 | 8/2003 | Zilberstein et al. |
| 6,928,474 | B2* | 8/2005 | Venkatesan ............... 709/224 |
| 7,181,447 | B2 | 2/2007 | Curtis et al. |
| 7,222,293 | B1* | 5/2007 | Zapiec et al. ............. 715/205 |
| 7,490,056 | B2* | 2/2009 | Nash ...................... 705/26.43 |
| 7,848,952 | B2* | 12/2010 | Spears et al. ............... 705/22 |
| 8,249,949 | B2* | 8/2012 | Nash ...................... 705/26.8 |
| 2002/0065761 | A1* | 5/2002 | Fischer et al. ............. 705/37 |
| 2002/0143813 | A1* | 10/2002 | Jellum et al. ............. 707/511 |
| 2003/0033448 | A1* | 2/2003 | Kieffer ................... 709/331 |
| 2003/0037140 | A1 | 2/2003 | Aaltonen |
| 2003/0187775 | A1* | 10/2003 | Du et al. .................. 705/37 |
| 2005/0177486 | A1 | 8/2005 | Yeager |
| 2006/0008256 | A1 | 1/2006 | Khedouri et al. |
| 2006/0069635 | A1 | 3/2006 | Ram et al. |
| 2006/0095431 | A1 | 5/2006 | Nash |
| 2007/0214075 | A1 | 9/2007 | Ablan |
| 2008/0201376 | A1 | 8/2008 | Khedouri et al. |
| 2009/0234846 | A1 | 9/2009 | Nash |

OTHER PUBLICATIONS

Anon "Search4Auctions.com Launches Real-Time Auction Ticker Applet Enabling Users to Monitor Bids on Multiple Auction Sites," PR Newswire, May 16, 2000.*

U.S. Appl. No. 11/026,942 Notice of Allowance Mailed on Sep. 23, 2008, 15 Pgs.

U.S. Appl. No. 11/026,942 Non-Final Office Action mailed Feb. 1, 2008, 13 Pgs.

Aizen, J., et al., "Traffic-based Feedback on the Web", *Proceedings of the National Academy of Sciences*, vol. 101, Supl. 1, (Apr. 6, 2004), 5254-5260.

Anon., "InfoSpace and Ask Jeeves Announce Search Agreement", *Business Wire*, (Mar. 19, 2002), 0145.

Anon., "The Salt Lake Tribune Cybersavvy Column", *Knight-Ridder Tribune Business News (Salt Lake Tribute—Utah)*, (Jun. 5, 1999), 2 pgs.

Anon., "uBid.com Launches Six New Product Categories", *Business Wire*, (Dec. 10, 1999), 2 pgs.

Grimes, A., et al., "Digits", *Wall Street Journal (Eastern Edition)*, (Apr. 10, 2003), B4.

Kennedy, S. D, "All the News Really Does Fit", *Information Today*, vol. 19(10), (Nov. 2002), 32-33.

"U.S. Appl. No. 12/366,459, Non Final Office Action mailed Sep. 27, 2011", 17 pgs.

"U.S. Appl. No. 12/366,459 , Response filed Feb. 27, 2012 to Non Final Office Action mailed Sep. 27, 2011", 10 pgs.

"U.S. Appl. No. 12/366,459, Notice of Allowance mailed Apr. 18, 2012", 13 pgs.

* cited by examiner

SYSTEM TO GENERATE AN AGGREGATE INTEREST INDICATION WITH RESPECT TO AN INFORMATION ITEM

RELATED APPLICATION

The present application is a continuation of U.S. patent application Ser. No. 12/366,459 filed Feb. 5, 2009 now U.S. Pat. No. 8,249,949 and application Ser. No. 11/026,942 filed Dec. 30, 2004 and issued as U.S. Pat. No. 7,490,056 on Feb. 10, 2009, which in turn claims the benefit under 35 U.S.C. §119(e) of U.S. Provisional Application No. 60/625,435, filed Nov. 4, 2004, the entire content of each application being incorporated herein by reference.

TECHNICAL FIELD

Exemplary embodiments of the present invention relate generally to the technical field of data processing and, in one exemplary embodiment, to a system to generate an aggregate interest indication for an information item.

BACKGROUND

A number of websites, such as publishing websites (e.g., newspapers, etc.) and commerce websites (e.g., store or marketplace websites), allow users to add items that may be offered for sale via such websites to lists that are maintained by the relevant website, on behalf of the user. For example, certain commerce websites (e.g. Amazon.com) allow users to add items offered for sale via that website to a so-called "wish list", which is in effect a registry of items that a particular user may like to acquire. Similarly, certain marketplace websites (e.g., eBay.com) allow users to add listings to a "watch list", responsive to which the commerce websites conveniently present information (e.g., via a customized web page or by email) to the relevant user.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system to generate an aggregate interest indication for an information item are described. In the following description, for purposes of explanation, numerous specific details are set forth in order to provide a thorough understanding of the present invention. It will be evident, however, to one skilled in the art that the present invention may be practiced without these specific details.

Exemplary Platform Architecture

Figure 1:
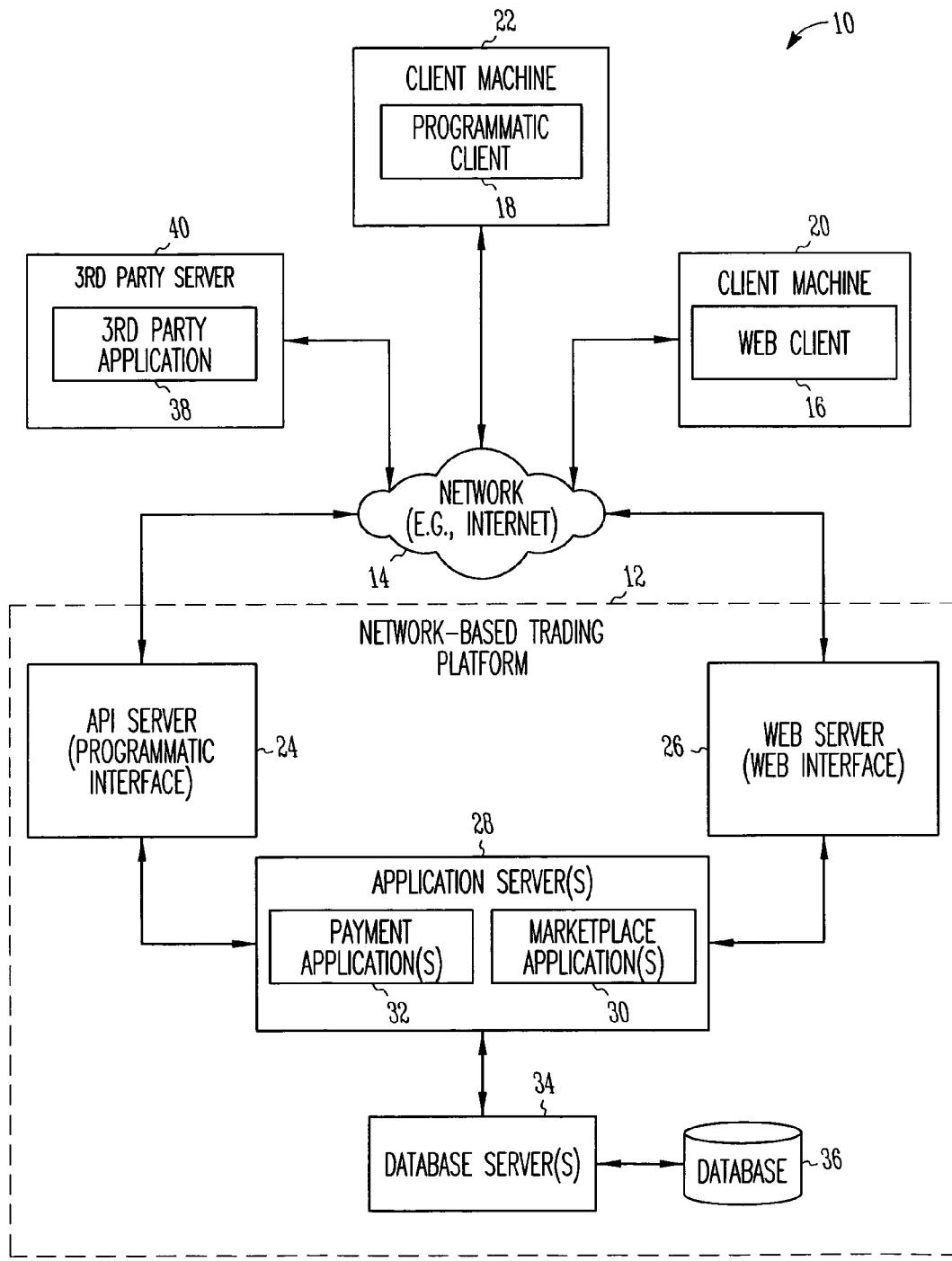
FIG. 1 is a diagram of an exemplary network-based commerce system, in accordance with the invention.

FIG. 1 is a network diagram depicting a system 10, according to one exemplary embodiment of the present invention, having a client-server architecture. A commerce platform, in the exemplary form of a network-based commerce system or marketplace 12, provides server-side functionality, via a network 14 (e.g., the Internet) to one or more clients. FIG. 1 illustrates, for example, a web client 16 (e.g., a browser, such as the Internet Explorer browser developed by Microsoft Corporation of Redmond, Wash. State), and a programmatic client 18 executing on respective client machines 20 and 22.

Turning specifically to the network-based marketplace 12, an Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more databases servers 34 that facilitate access to one or more databases 36.

The marketplace applications 30 provide a number of marketplace functions and services to users that access the marketplace 12. The payment applications 32 likewise provide a number of payment services and functions to users. The payment applications 30 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based marketplace 12, it will be appreciated that, in alternative embodiments of the present invention, the payment applications 32 may form part of a payment service that is separate and distinct from the marketplace 12.

Further, while the system 10 shown in FIG. 1 employs a client-server architecture, the present invention is of course not limited to such an architecture, and could equally well find application in a distributed, or peer-to-peer, architecture system. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the marketplace 12 in an off-line manner, and to perform batch-mode communications between the programmatic client 18 and the network-based marketplace 12.

FIG. 1 also illustrates a third party application 38, executing on a third party server machine 40, as having programmatic access to the network-based marketplace 12 via the programmatic interface provided by the API server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12.

Exemplary Marketplace Applications

Figure 2:
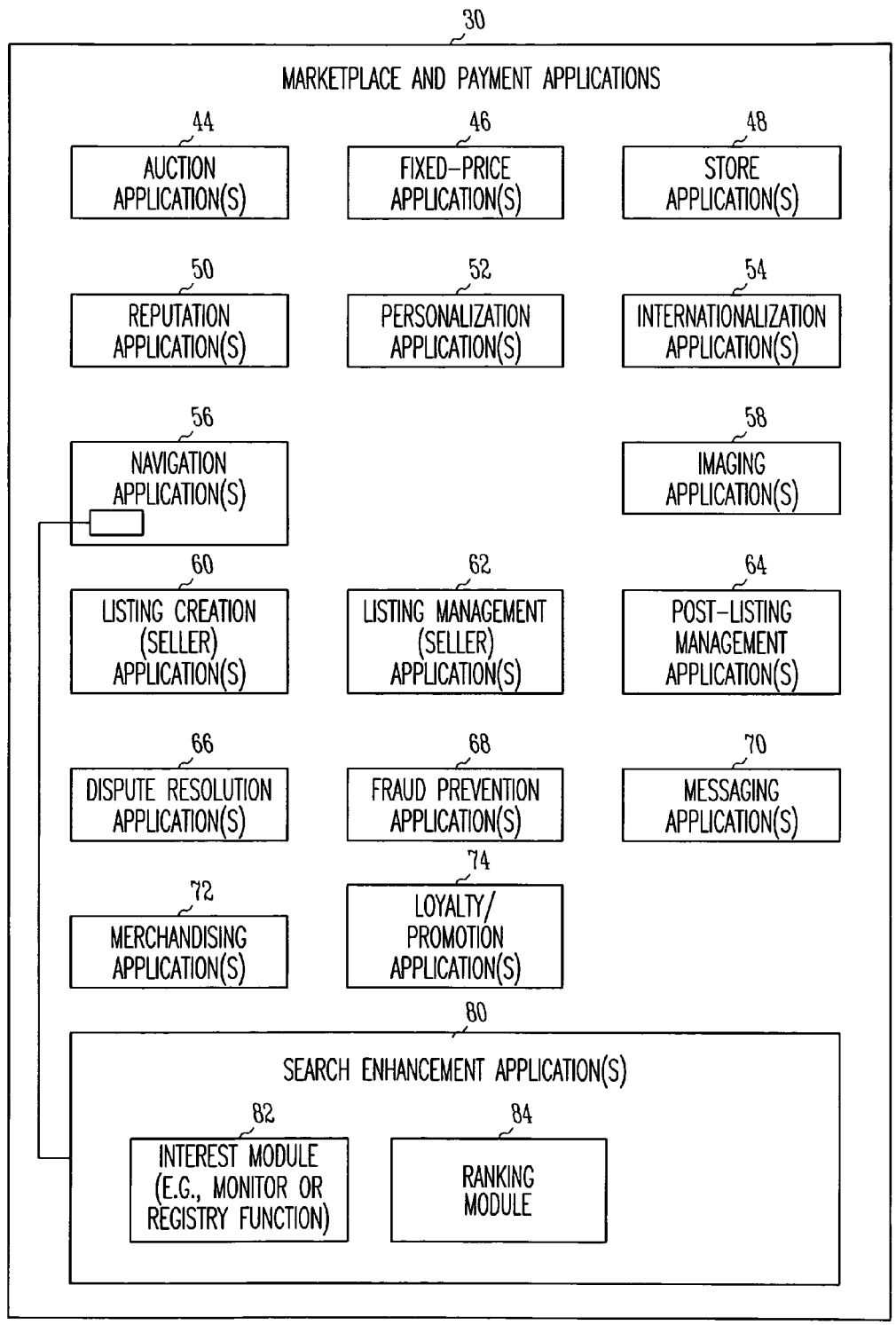
FIG. 2 is a block diagram illustrating exemplary multiple marketplace and payment applications.

FIG. 2 is a block diagram illustrating multiple marketplace and payment applications 30 that, in one exemplary embodiment of the present invention, are provided as part of the network-based marketplace 12. The marketplace 12 may provide a number of listing and price-setting mechanisms whereby a seller may list goods and/or services for sale, a buyer can express interest in or indicate a desire to purchase such goods and/or services, and a price can be set for a transaction pertaining to the goods and/or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace 12 to establish, build and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based marketplace 12 over time. Other potential trading partners may then reference such a reputation for the purposes of assessing credibility and trustworthiness.

Personalization applications 52 allow users of the marketplace 12 to personalize various aspects of their interactions with the marketplace 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace 12 and other parties.

In one embodiment, the network-based marketplace 12 may support a number of marketplaces that are customized, for example, for specific geographic regions. A version of the marketplace 12 may be customized for the United Kingdom, whereas another version of the marketplace 12 may be customized for the United States. Each of these versions may operate as an independent marketplace, or may be customized (or internationalized) presentations of a common underlying marketplace.

Navigation of the network based-marketplace 12 may be facilitated by one or more navigation applications 56. For example, a search application enables key word searches of listings published via the network-based marketplace 12. A browse application allows users to browse various category, catalogue, or inventory data structures according to which listings may be classified within the marketplace 12. Various other navigation applications may be provided to supplement the search and browsing applications.

In one embodiment, the navigation applications 56 may include one or more search enhancement applications 80, which operate to provide information to users (e.g., via a "homepage" of the network-based marketplace 12) regarding activities that are being performed by a user community. For example in one embodiment, the search enhancement applications 80 may identify lists of top ranked listings, published by the network-based marketplace 12. One such a list of top ranked listings may be a list of listings that are the most "monitored" by a community of users, the monitoring function being supported by an interest module 82 of the applications 80. For example, the interest module 82 may enable a user to add a particular listing to a "watch list" or "monitored list" that is maintained by the network-based marketplace 12 on behalf of the user. The interest module 82 may also enable users to register interest with respect to a listing in one of a number of other ways, including by adding a particular listing to a "gift registry" or "wish list" that is maintained for the user. The lists may also be restricted or based on other attributes (e.g., category, price, geographic location of seller, etc.).

The search enhancement applications 80 may also include a ranking module 84 that operates to generate lists of "top-ranked listings", by measuring (e.g., counting) various metrics pertaining to listings published by the network-based marketplace 12. For example, in one embodiment, the ranking module 84 may count the number of users that have registered interest, via the interest module 80, in a particular listing (e.g., the users may have flagged the listing as being of potential interest). The ranking module 84 may then generate an interest indication value (e.g., a count) for each of a number of listings, and then rank the listings according to the interest indication value. A predetermined number of "top ranked listings" may then be identified by the ranking module 84. Such "top-ranked listings" may be published by the trading platform 12.

In order to make listings, available via the network-based marketplace 12, as visually informing and attractive as possible, the marketplace applications 30 may include one or more imaging applications 58 which users may utilize to upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers conveniently to author listings pertaining to goods or services that they wish to transact via the network-based marketplace 12, and listing management applications 62 allow sellers to manage such listings. Specifically, where a particular seller has authored and/or published a large number of listings, the management of such listings may present a challenge. The listing management applications 62 provide a number of features (e.g., auto-relisting (automatically re-listing an expired listing), inventory level monitors, etc.) to assist the seller in managing such listings. One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace 12.

Messaging applications 70 are responsible for the generation and delivery of messages to users of the network-based marketplace 12, such messages for example advising users regarding the status of listings at the marketplace 12 (e.g., providing "outbid" notices to bidders during an auction process or to provide promotional and merchandising information to users).

Merchandising applications 72 support various merchandising functions that are made available to sellers to enable sellers to increase sales via the network-based marketplace 12. The merchandising applications 80 also operate the various merchandising features that may be invoked by sellers, and may monitor and track the success of merchandising strategies employed by sellers.

The network-based marketplace 12 itself, or one or more parties that transact via the marketplace 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Exemplary Data Structures

Figure 3:
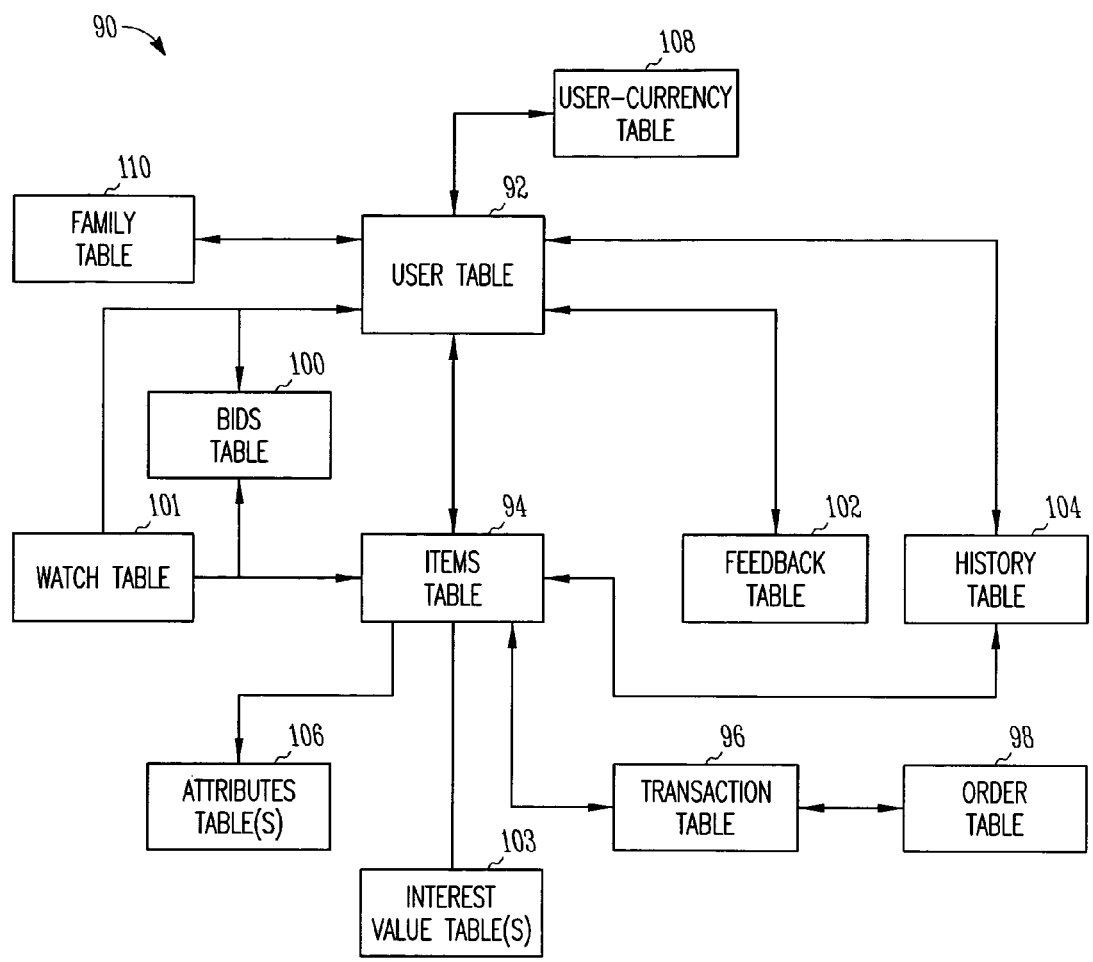
FIG. 3 is a high-level entity-relationship diagram, illustrating various exemplary tables that may be maintained within databases of the system.

FIG. 3 is a high-level entity-relationship diagram, illustrating various tables 90 that may be maintained within the databases 36, and that are utilized by and support the marketplace and payment applications 30 and 32. A user table 92 contains a record for each registered user of the network-based marketplace 12, and may include identifier, address and financial instrument information pertaining to each such registered user. A user may, it will be appreciated, operate as a seller, a buyer, or both, within the network-based marketplace 12. In one exemplary embodiment of the present invention, a buyer may be a user that has accumulated value (e.g., commercial or proprietary currency), and is then able to exchange the accumulated value for items that are offered for sale by the network-based marketplace 12.

The tables 90 also include an items table 94 in which are maintained item records for goods and services that are available to be, or have been, transacted via the marketplace 12. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94.

An order table 98 is populated with order records, each order record being associated with an order. Each order, in turn, may be with respect to one or more transactions for which records exist within the transactions table 96.

Bid records within a bids table 100 each relate to a bid received at the network-based marketplace 12 in connection with an auction-format listing supported by an auction application 44. A feedback table 102 is utilized by one or more reputation applications 50, in one exemplary embodiment, to construct and maintain reputation information concerning users. A history table 104 maintains a history of transactions to which a user has been a party. One or more attributes tables 106 record attribute information pertaining to items for which records exist within the items table 94. Considering only a single example of such an attribute, the attributes tables 106 may indicate a currency attribute associated with a particular item, the currency attribute identifying the currency of a price for the relevant item as specified in by a seller.

The tables 90 are further shown to include an association data structure, in the exemplary form of a watch table 101, that stores associations between listings, for which records are maintained in the items table 94, and users, for which records are maintained in the user table 92. Specifically, the watch table 101 may record registration of a user in a monitoring capacity with respect to one of more listings.

Further, the tables 90 may, in one embodiment, included an interest value table 103 in which is stored interest values for each of the listings for which records are maintained in the items table 94. An interest value for each listing may be generated, for example, by counting the number of unique registrations of user interest (e.g., monitoring or flagging) in the relevant listing. The interest values as stored within the table 103 may be generated, in one embodiment, by the ranking module 84 discussed above with reference to FIG. 2.

According an exemplary embodiment of the present invention, there is provided a method and system to rank, search or otherwise process, information items that are published via a publication or sales system, based on the degree of user interest with respect to such an information item. For example, within the context of a commerce website (e.g., an online store or electronic marketplace), users of the relevant commerce system may indicate or register interest with respect to a specific information item (e.g., a product or service listing) in a number of ways. A user may add a particular listing to a registry (e.g., a "wish list") or to a "watch list", under which the commerce system may monitor activity pertaining to the listing with a view to providing automatic notifications regarding any activity. The commerce website may also present customized information including information regarding listings that have been added to the "watch list".

Figure 4:
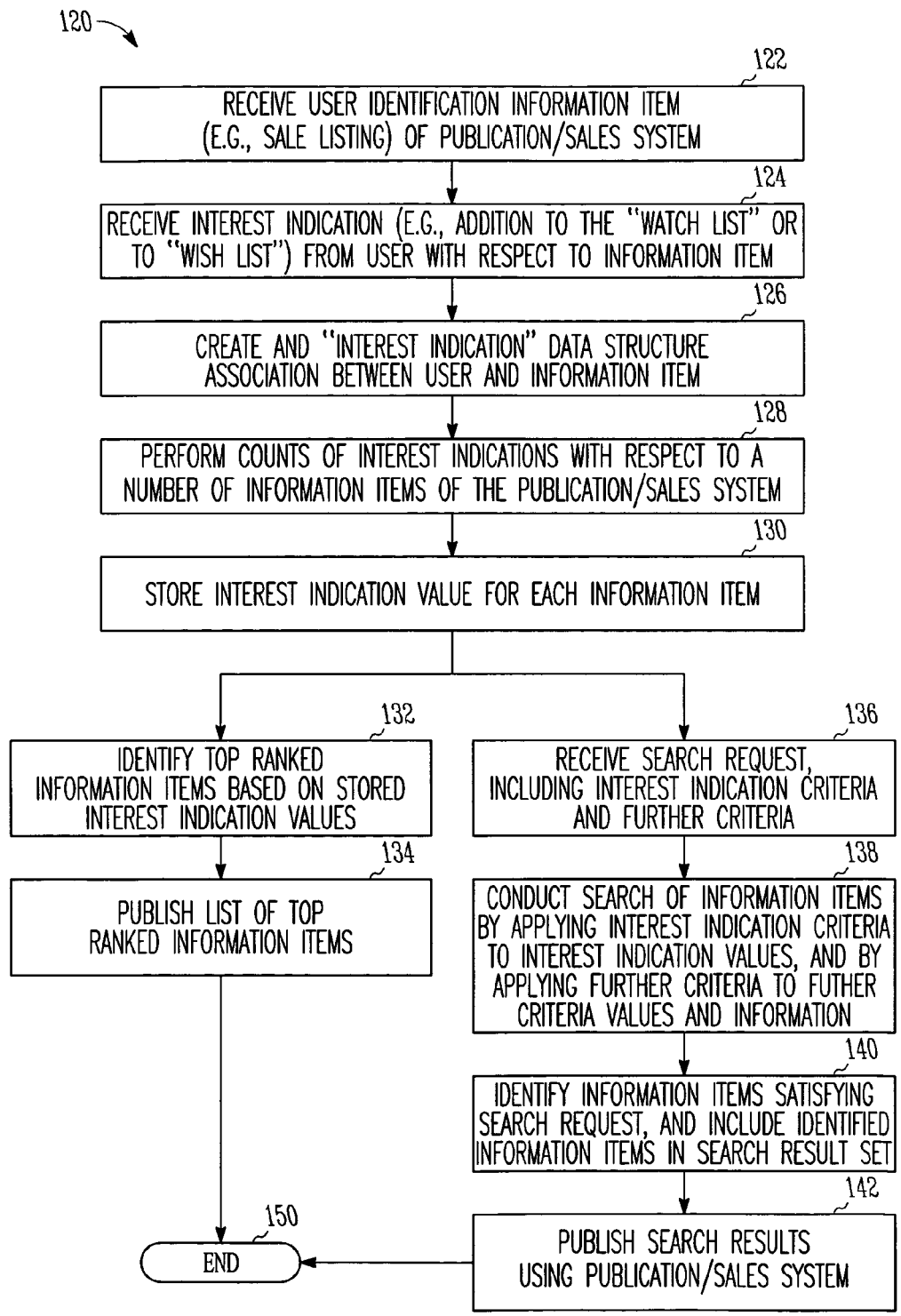
FIG. 4 is a flow chart illustrating a method, according to an exemplary embodiment of the present invention, to rank, search or otherwise generate an interest indication or measure, with respect to an information item.

FIG. 4 is a flow chart illustrating a method 120, according to an exemplary embodiment of the present invention, to rank, search or otherwise generate an interest indication or measure, with respect to an information item (e.g., a sale listing)

that may be published via a publication and/or sales system, such as a network-based marketplace or an electronic commerce system.

The method 120 assumes that the identity of a user, to which information is made available by a publication and/or sales system, (e.g., the network-based marketplace 12), is known to the system. To this end, a user may have a logged into a website (e.g., using a username/password pair) operated by the publication and/or sales system. Alternatively, the identity of the user may be determined by some other mechanism, such as a cookie deposit by the publication and/or sales system.

At block 122, user identification of a specific information item is received at the publication/sales system from the user, via the network. For example, the user may have conducted a search of information items, and have selected a particular information item as being of interest. This identification may comprise, for example, a user clicking on identification information pertaining to the information item, and the user thus navigating to a webpage dedicated primarily to the information item of interest. Taking a commerce website as an example, a user may for example, have "clicked through" a hypertext link presented in a list of search results, to be presented with a webpage providing a detailed sale listing pertaining to it.

Responsive to the user identification of the information item, a mechanism may then be presented to the user whereby the user can indicate or register interest in the item (e.g., tag the item). For example, continuing the above example of a sale listing presented on a commerce website, a button may be presented within a listing page that, when selected by a user, adds the relevant sale listing to a "wish list", registry or "watch list". In a similar fashion, the identification of the item may be a user adding the item to a so-called website "shopping cart."

In any event, responsive to user indication, via the presented mechanism, of interest in the information item, an interest indication is received, at block 124, at the publication and/or sales system, this interest indication being received in conjunction with information identifying the user. For example, where a session identifier is utilized to maintain state between a client system and a server system, a session identifier may be included within a URL communicated from the client to the server system, the session identifier operating to identify the user. Where a cookie is stored on the client machine, information may be extracted from this cookie, and included in the information received at the publication and/or sales system, to thereby identify the user to the system.

At block 126, the publication and/or sales system creates an interest indication data structure association between the user and the information item. For example, the publication and/or sales system may supplement a record, maintained for the user, with information to identify that the user has expressed or registered interest within an information item. In one embodiment, the publication and/or sales system may maintain a relational data base, and a relational association may be created between the user and the relevant information item.

In an alternative embodiment, as opposed to creating an association between the user and the information item, a count of the number of users that have expressed or registered interest in a particular information item maybe incremented responsive to the receipt of the interest indication at block 124. In a further embodiment, such a count may be incremented in addition to the above described association being created.

At block 128, the publication and/or sales system performs a count of interest indications with respect to each of a number of information items maintained thereby. As mentioned above, this may, in one embodiment, involve performing a count of the number of associations between each information item and users. In another embodiment, this may simply involve a read operation to read a number of counts that have been previously registered with respect to each of a number of information items.

At block 130, an interest indication value, derived from the count performed at block 128, may be stored for each information item. These interest indication values may be stored, in one embodiment, in a cache memory structure to thus improve the response times for queries that may be run against the stored interest indication values.

In one embodiment, the method 120 may then branch to block 132, where the publication and/or sales system proceeds to identify the "top ranked" information items, based on the interest indication values. For example, the "top 10" information items, ranked according to interest indication values, may be identified at block 132. In further embodiments, the identification of the "top ranked" information items may include the application of further criteria. For example, only information items of a particular status (e.g., active), published within certain time constraints (e.g., published in the last 24 hours), published within certain product or service categories, or including certain description information (e.g. meeting a certain price criteria) may be included within the "top ranked" information items.

At block 134, the publication and/or sales system may publish a list of the top ranked information items. For example, this list may be published on the "homepage" of a website, thereby to provide other users of the website with a convenient indication of which information items (e.g., sales listings) of the website are receiving interest from a community of users.

Figure 5:
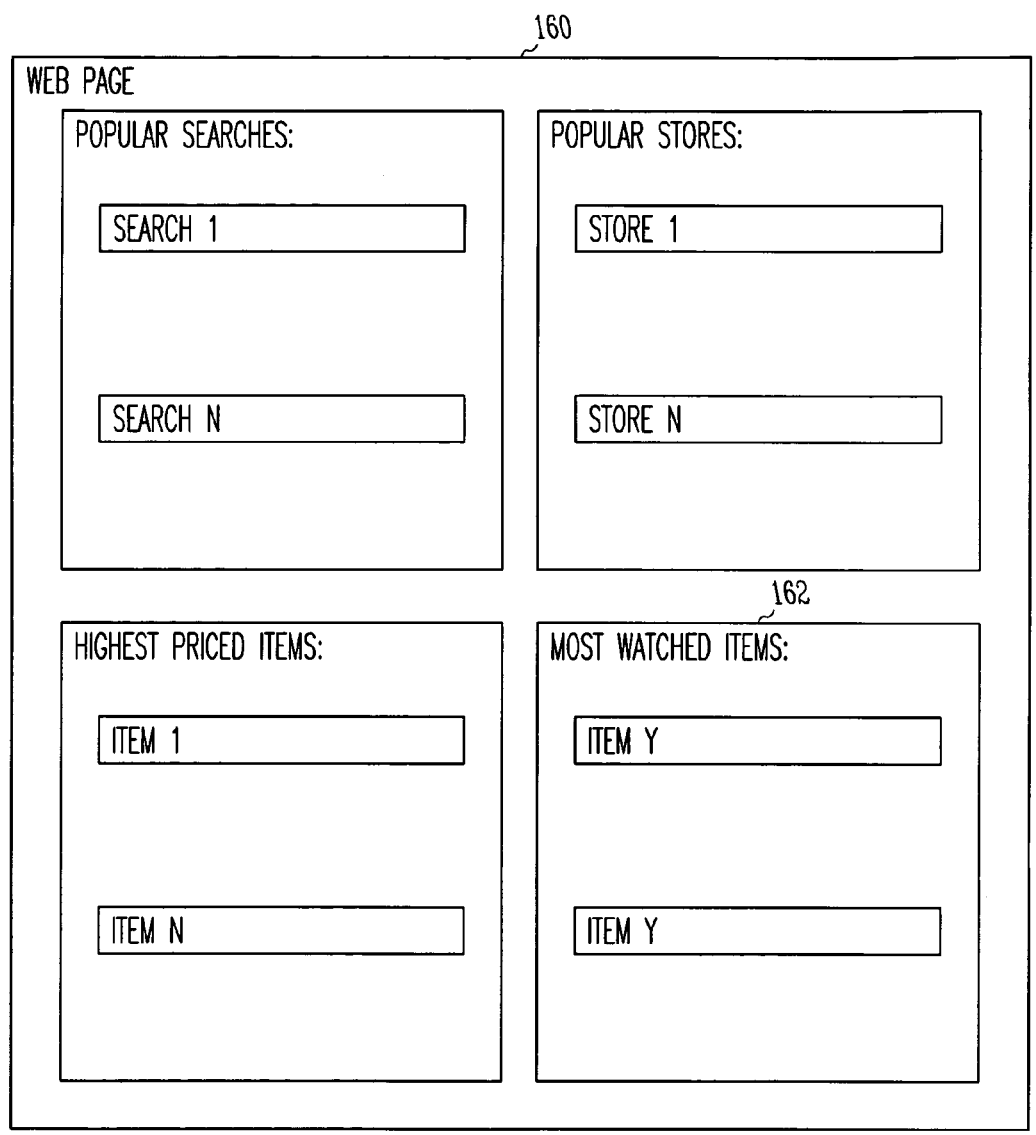
FIG. 5 illustrates an exemplary user interface that is utilized to publish a list of "most watched items"

FIG. 5 illustrates an exemplary user interface, in the form of a web page 160, that is utilized to publish a list of "most watched items" 162, this list constituting an example of a list of top ranked information items that may be published by the publication and/or sales system.

Returning to the method 120, from block 130, the method 120 may also branch to block 136, where the publication and/or sales system receives a search request, including interest indication criteria as well as further criteria. For example, the search request may be received from a user, and may specify that only information items having an interest indication value exceeding a specified threshold value be returned responsive to the query. Further, the query may include further filter criteria such as status criteria (e.g., only active items), category criteria (e.g., only return sales listings within a particular product or service category), website criteria (e.g., only return sales listings published via a country specific website operated by the publication and/or sales system), price criteria (e.g., only return sales listings for which the current price is below a predetermined value), or any one of a number of other criteria.

At block 138, the publication and/or sales system conducts a search of information items by applying the information indication criteria to the stored interest indication values, and also by applying further criteria to further criteria values and information.

At block 140, information items that satisfy the search request are identified, and included in a search result set that is then published, via the publication and/or sales system, at block 142.

The method then ends at block 150.

As noted above, the interest that is registered by the publication and/or sales system in a particular information item may be registered, in one embodiment, responsive to a specific and affirmative indication by the user of interest in the information item. In the example where the information item is a sales listing, published by a commerce site or electronic marketplace, this interest indication may be received by the user invoking a monitoring or flagging function with respect to the sale listing. The monitoring function, performed by the publication and/or sales system on behalf of the user, may present information regarding monitored sales listing in a customized webpage (e.g., a portal webpage that is customized for the particular user).

Further, the monitoring function may include providing alerts to the user regarding activity (e.g., transaction activity) pertaining to the sale listings. For example, where the sale listing utilizes an auction price setting process, the monitoring function may provide a communication (e.g., an email or other electronic notification) to the user regarding bidding activity that has caused the price associated with a sale listing to increase. Further, where information presented in the sale listing includes a fixed-priced item, and a seller, subsequent to publishing as the initial sale listing, reduces a fixed asking price, the monitoring function may also communicate this type of activity pertaining to the sales listing to the user.

Turning specifically to an exemplary embodiment in which the publication and/or sales system is an electronic marketplace, the above described technologies may serve to assist in establishing the relevance, or interest levels, across dynamic and electronic marketplace. Specifically, the above described system may rank information items (e.g., sales listings) based on the number of "watches" or monitors or flags that are established with respect to an information item. In one embodiment, the ability to initiate a monitoring function, or register a specific interest indication, with respect to an information item may be limited to users that are registered with the publication and/or sales system. In this way, the system may provide a "one-member, one-vote" function.

Accordingly, an embodiment of the present invention proposes making visible to other users, interest that users in aggregate have expressed, indicated or registered with respect to a particular information item. This aggregation and presentation of interest indications may furthermore be generalized to various methods of ranking, and otherwise indicating relative relevancies. Further, by maintaining a count, or other measure, of registered interest indications with respect to information items, searching capabilities that are provided by the publication and/or sales system may be enhanced.

According to one exemplary embodiment, there is provided a system and a method to generate a list (e.g., a top 10) of most monitored (e.g., "watched") items per category per site to provide a dynamic overview of consumer interest levels within an electronic marketplace, to expose demand and encourage similar purchases by buyers, to expose demand and encourage new supply from sellers, etc. The list of watched items may be generated at least on a daily basis, and may be a generated as close to real time as possible.

The following are exemplary features for the Most Watched Items.

Most Watched Items Batch Overview

Users can, in one embodiment, add an item to a list of monitored sale listings (e.g., to their "watch list" maintained at an electronic marketplace). The Most watched items may be those active, "gallery featured" (or otherwise announced listings for) items that have the highest watch count (e.g., the most number of users are watching them). In other embodiments, the "most watched" items may be those for which the respective sale of listing has otherwise been enhanced.

The items for the Most Watched Items may be filtered as follows:
   If there is a filter (e.g., a category filter, price filter, status filter etc), items will be filtered accordingly.
   In a further embodiment, only listings that have the gallery feature will be included.
   In yet a further embodiment, only items that are still currently active will be included.

Exemplary Functional Specification

Figure 6:
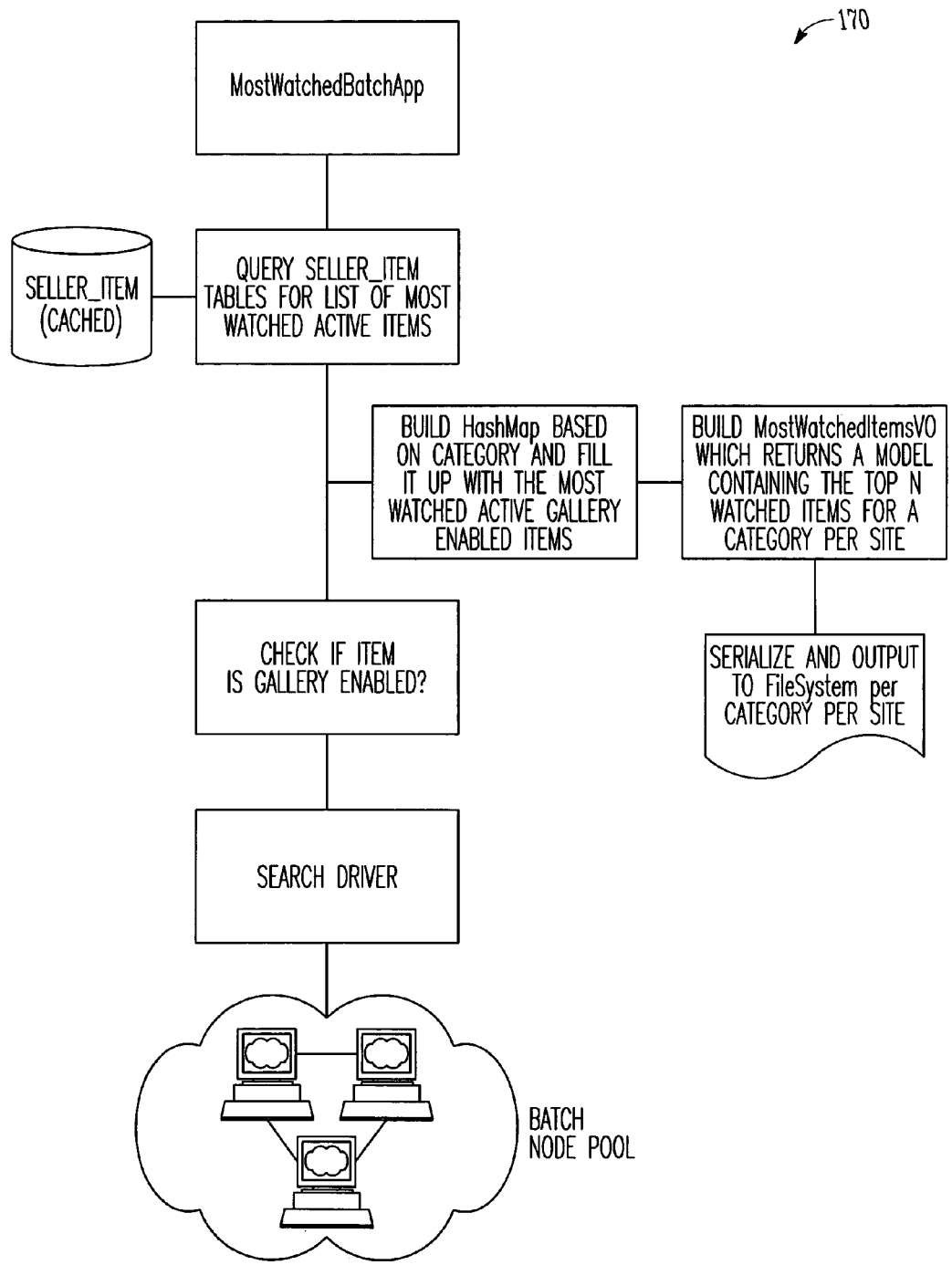
FIG. 6 is a flow chart illustrating a method, according to an exemplary embodiment of the present invention, to create a data structure of sales listings in which users have expressed or registered in interest.

FIG. 6 is a flow chart illustrating a method 170, according to an exemplary embodiment of the present invention, to create a data structure of sales listings in which users have expressed or registered in interest.

In one embodiment, a MostWatchedItemsBatch job runs once a day. The batch job queries the SELLER_ITEM table and retrieves the watched items ranked within top 10 based on the watch count.

An exemplary SQL query is:

```
select * from (a
SELECT ITEM_ID , LEAF_CAT , PARENT_CAT, META_CAT,
site_id ,
watch_count, rank( ) over (partition by leaf_cat , site_id order by
watch_count desc )
as dr
FROM CASH_USER.SELLER_ITEM_CACHE_IOT_X WHERE
WATCH_COUNT > 0 and end_time > sysdate )
where dr <= n
```

The batch job forms a Category tree per site (e.g., where an electronic marketplace contains many websites) and fills in the top 10 watched items for each leaf and each meta category. It may query all the IOTs and merge the data into the category tree such that the Category tree will finally have top 20 watched items per category per site.

While adding the data into the category tree, the batch job may check if the item has gallery enabled by going against search backend.??

Once the Category tree is filled with all the relevant data, the output may be written to XML files per site per category. This may be done by a pool of threads.

Exemplary Batch Job Functionality

Figure 7:
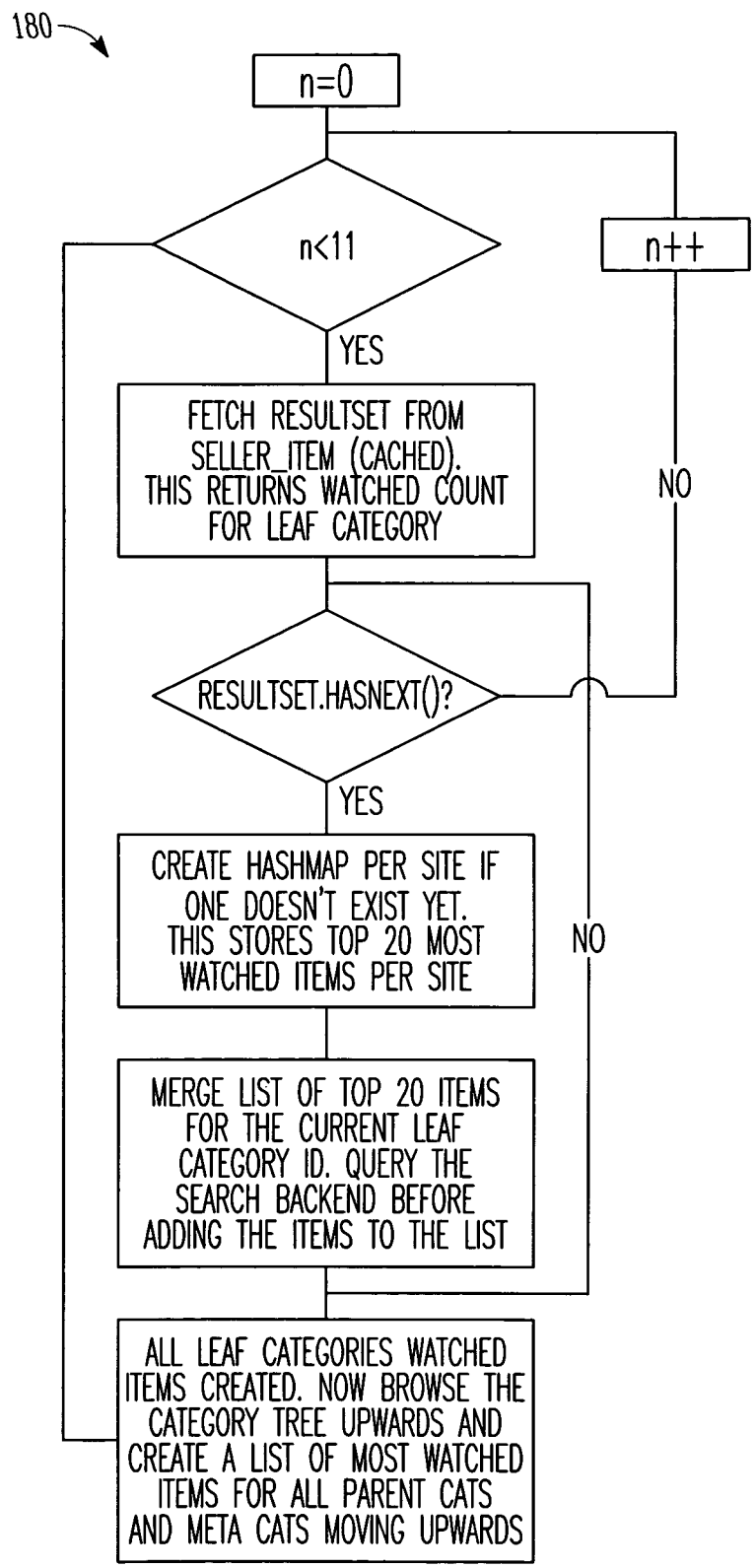
FIG. 7 is a high level flow chart illustrating a method, according to exemplary embodiment of the present invention, for creating a category tree for the top n most watched items.

FIG. 7 is a high level flow chart illustrating a method 180, according to exemplary embodiment of the present invention, for creating a category tree for the top n most watched items.

The exemplary method 180 includes the following operations:

1. Query the SELLER_ITEM (e.g., cached) tables fetching the items ranked top n most ranked watched (monitored/flagged) items per category per site. 'n' is configurable and is set to 10 by default. The query may be done by calling a "SellerSale.findMostWatchedActiveItems" method call. This query may return a List object containing "SellerSaleCache" objects.
2. Create a hashmap per site encountered in the resultset if one doesn't exist already.
3. Aggregate the list of most ranked watched items per category and store it as a List object in a HashMap with category id as the key.
4. For each item that potentially goes to the most watched list, query the backend node to check if the item has gallery enabled.

5. If there are more rows in the resultset for the same category/site, calculate the most watched 20 items and merge to this list.
6. After processing all the leaf categories obtained from the queries, browse the Category tree upwards using the CategoryBO. Merge the top 20 items from all the children categories. Fill in the list for all parent categories browsing upwards.
7. A MostWatchedItemsVO returns a XML model for the most watched items for the given category and given site. This looks up the hashmaps created while parsing the resultset.
8. A thread from a pool of threads may then pick up a category from the list of all categories and writes out a serialized version of the XML Model to a file named "<categoryId>.xml" in directory "site_<siteId>".

Once the batch is done, the scheduling chain may calls the script to summarize the run results and email it to an alias. The scheduling chain may be setup to run the batch every 24 hours. The scheduling chain should, in one embodiment, not automatically attempt to restart the batch if it failed. Instead the next scheduled run should be started as in a normal situation.

In one embodiment, the above-described operations may be performed as an entire back-end project, and no user interface (UI) and no user-visible changes may be presented on a website operated by an electronic marketplace.

Exemplary XML Model

As noted above, in one embodiment, the batch job composes XML as the output per site id and per category.

Below is a sample XML document that specifies exemplary tags that may be used.

```
<?xml version="1.0" encoding="ISO-8859-1"?>
< web site >
    <mostWatchedItems>
        <Item id="5712669397" rank="1"/>
        .........
        <Item id="4432146754" rank="20"/>
    </mostWatchedItems>
</web site >
```

One file per category per site may be created.

Figure 8:
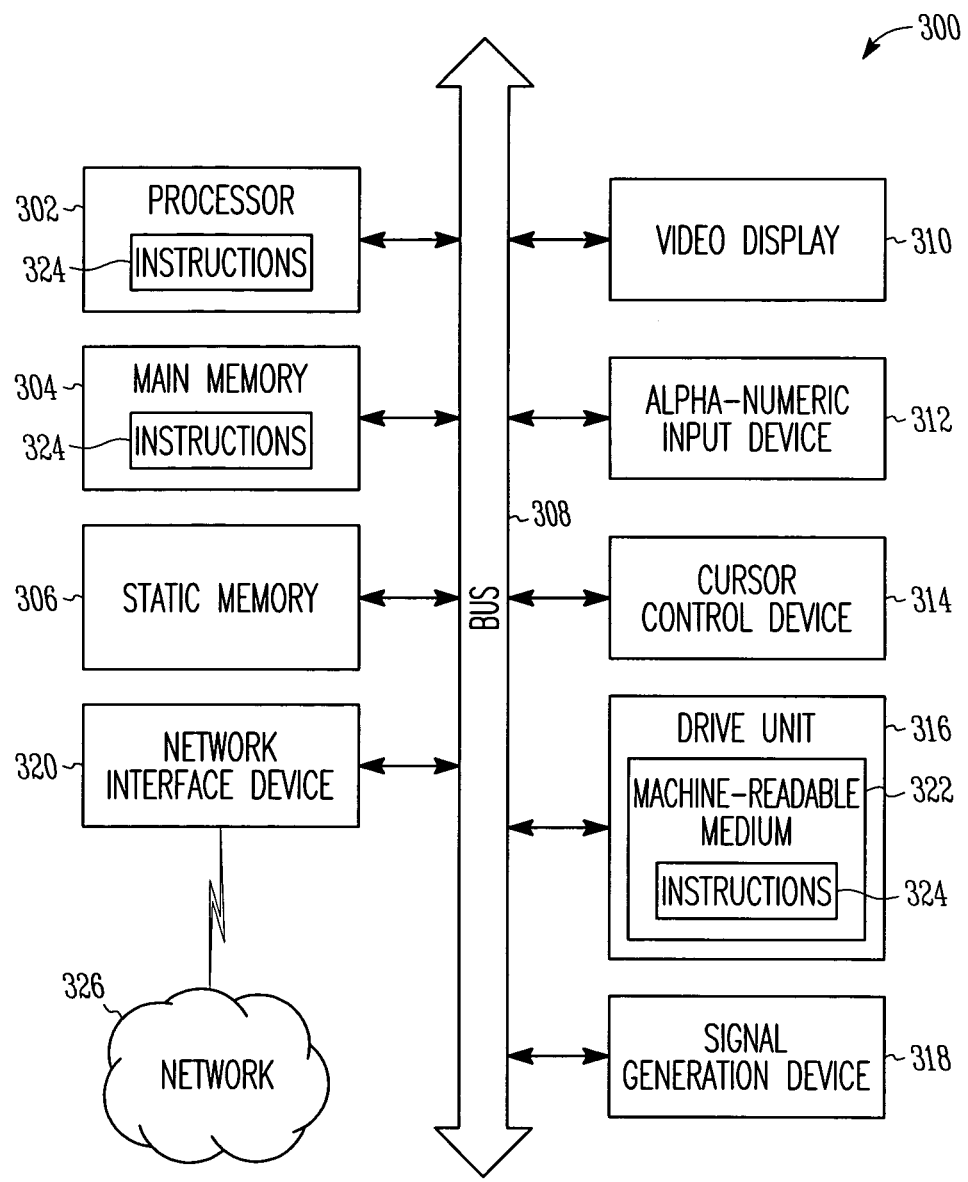
FIG. 8 shows a diagrammatic representation of machine in the exemplary form of a computer system within which a set of instructions, for causing the machine to perform any one or more of the methodologies discussed herein, may be executed.

FIG. 8 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media. The software 324 may further be transmitted or received over a network 326 via the network interface device 320.

While the machine-readable medium 392 is shown in an exemplary embodiment to be a single medium, the term "machine-readable medium" should be taken to include a single medium or multiple media (e.g., a centralized or distributed database, and/or associated caches and servers) that store or embodies the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to generate an aggregate indication for an information item have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer system including:
   a processor;
   a database configured to store a plurality of listings published over a network;
   a machine-readable medium with instructions stored thereon which when executed by the processor cause the computer system to:
   receive an interest indication from a user for a listing in the plurality of listings, the interest indication flagging the listing to monitor the listing for subsequent activity;
   create and store an interest indication data structure indicating the user has flagged the listing to monitor the listing for subsequent activity and associate the interest indication data structure with the listing;
   generate a ranking for the listing based on the number of stored interest indication data structures associated with monitoring the listing for subsequent activity;
   identify top ranked listings from the plurality of listings based on one or more stored interest indication data structures associated with monitoring listings for subsequent activity; and
   publish a list of the top ranked listings.

2. The computer system of claim 1, wherein executing the instructions by the processor causes the computer system to:

perform a count of interest indication data structures with respect to a number of listings published over the network.

3. The computer system of claim 2, wherein executing the instructions by the processor causes the computer system to:
store an interest indication value for each listing, wherein the interest indication value is derived from the count of interest indication data structures for a listing.

4. The computer system of claim 3, wherein identifying top ranked listing from the plurality of listings based on one more interest indication structures includes:
ranking the plurality of listings based on the stored indication value for each of the plurality of listings.

5. A computer system including:
a processor;
a database configured to store a plurality of listings published over a network;
a machine-readable medium with instructions stored thereon which when executed by the processor cause the computer system to:
receive an interest indication from a user for a listing in the plurality of listings, the interest indication flagging the listing to monitor the listing for subsequent activity;
create and store an interest indication data structure indicating the user has flagged the listing to monitor the listing for subsequent activity and associate the interest indication data structure with the listing;
create a ranking for the listing based on the number of stored interest indication data structures associated with monitoring the listing for subsequent activity;
receive a search request including interest indication criteria associated with listings monitored for subsequent activity;
identify one or more listings that satisfy the interest indication criteria; and
publish a list of the one or more listings.

6. The computer system of claim 5, wherein executing the instructions by the processor causes the computer system to:
perform a count of interest indication data structures with respect to a number of listings published over the network.

7. The computer system of claim 6, wherein executing the instructions by the processor causes the computer system to:
store an interest indication value for each listing, wherein the interest indication value is derived from the count of interest indication data structures for a listing.

8. The computer system of claim 7, wherein the interest indication criterion includes a threshold interest indication value.

9. The computer system of claim 5, wherein the search request includes additional criteria, the additional criteria including a category of listing.

10. The computer system of claim 5, wherein the search request includes additional criteria, the additional criteria including a price threshold.

11. A computer-implemented method, the method including:
configuring, using at least one computing system, a database to store a plurality of listings published over a network;
receiving, using the least one computing system, an interest indication from a user for a listing in the plurality of listings, the interest indication flagging the listing to monitor the listing for subsequent activity;
creating and storing, using the at least one computing system, an interest indication data structure indicating the user has flagged the listing to monitor the listing for subsequent activity and associating the interest indication data structure with the listing;
generating a ranking for the listing based on the number of stored interest indication data structures associated with monitoring the listing for subsequent activity;
identifying, using the at least one computing system, top ranked listings from the plurality of listings based on the number of stored interest indication data structures for each listing associated with monitoring each listing for subsequent activity; and
publishing, using the at least one computing system, a list of the top ranked listings.

12. The computer-implemented method of claim 11, further including:
performing a count of interest indication data structures with respect to a number of listings published over the network.

13. The computer-implemented method of claim 12, further including:
storing an interest indication value for each listing, wherein the interest indication value is derived from the count of interest indication data structures for a listing.

14. The computer-implemented method of claim 11, wherein creating and storing an interest indication data structure associating the user and the listing includes:
storing the interest indication data structure in a relational database.

15. The computer-implemented method of claim 11, wherein identifying top ranked listing from the plurality of listings based on the number of stored interest indication data structures for each listing includes:
identifying active listings published over the network within a specified time period.

16. The computer-implemented method of claim 15, further including:
creating a hash-map for a category of listing.

17. The computer-implemented method of claim 16, further including:
filtering the top ranked listings based on the category of listing to identify top ranked listings for the category; and
adding the top ranked listing for the category to the hash-map.

18. A non-transitory machine-readable medium embodying instructions which, when executed by a machine, cause the machine to execute a method including:
configuring a database to store a plurality of listings published over a network;
receiving an interest indication from a user for a listing in the plurality of listings, the interest indication flagging the listing to monitor the listing for subsequent activity;
creating and storing an interest indication data structure indicating the user has flagged the listing to monitor the listing for subsequent activity and associating the interest indication data structure with the listing;
generating a ranking for the listing based on the number of stored interest indication data structures associated with monitoring the listing for subsequent activity;
identifying top ranked listings from the plurality of listings based on the number of stored interest indication data structures for each listing associated with monitoring each listing for subsequent activity; and
publishing a list of the top ranked listings.

19. The non-transitory machine-readable medium of claim 18, where the method which the machine is caused to executes includes:

performing a count of interest indication data structures with respect to a number of listings published over the network.

20. The non-transitory machine-readable medium of claim 18, where the method which the machine is caused to executes includes:
storing an interest indication value for each listing, wherein the interest indication value is derived from the count of interest indication data structures for a listing.

* * * * *

UNITED STATES PATENT AND TRADEMARK OFFICE
CERTIFICATE OF CORRECTION

PATENT NO.       : 8,706,567 B2
APPLICATION NO.  : 12/433602
DATED            : April 22, 2014
INVENTOR(S)      : Adam Nash It is certified that error appears in the above-identified patent and that said Letters Patent is hereby corrected as shown below:

In the Claims

In column 13, line 10, in Claim 4, after "one", insert --or--, therefor

In column 13, line 28, in Claim 5, delete "create" and insert --generate--, therefor Signed and Sealed this
Eleventh Day of November, 2014

Michelle K. Lee
*Deputy Director of the United States Patent and Trademark Office*